US011102393B2

(12) United States Patent
Gong et al.

(10) Patent No.: US 11,102,393 B2
(45) Date of Patent: Aug. 24, 2021

(54) VARIABLE MAGNIFICATION METHOD AND CAMERA

(71) Applicant: Hangzhou Hikvision Digital Technology Co., Ltd., Hangzhou (CN)

(72) Inventors: Qi Gong, Hangzhou (CN); Weimin Ma, Hangzhou (CN); Can You, Hangzhou (CN); Peng Xu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/058,217

(22) PCT Filed: Apr. 10, 2019

(86) PCT No.: PCT/CN2019/082007
§ 371 (c)(1),
(2) Date: Nov. 24, 2020

(87) PCT Pub. No.: WO2019/228073
PCT Pub. Date: Dec. 5, 2019

(65) Prior Publication Data
US 2021/0195091 A1 Jun. 24, 2021

(30) Foreign Application Priority Data
May 31, 2018 (CN) .......................... 201810550765.0

(51) Int. Cl.
*H04N 5/232* (2006.01)
(52) U.S. Cl.
CPC ..... *H04N 5/23212* (2013.01); *H04N 5/23287* (2013.01); *H04N 5/23296* (2013.01)
(58) Field of Classification Search
CPC ........... H04N 5/23212; H04N 5/23287; H04N 5/23296
See application file for complete search history.

(56) References Cited

U.S. PATENT DOCUMENTS

| 2014/0267831 | A1* | 9/2014 | Uchiyama | .......... H04N 5/23296 |
| | | | | 348/231.6 |
| 2015/0241756 | A1* | 8/2015 | Uchiyama | ........ H04N 5/232122 |
| | | | | 348/347 |
| 2015/0373253 | A1* | 12/2015 | Yano | .................. H04N 5/23212 |
| | | | | 348/349 |

FOREIGN PATENT DOCUMENTS

| CN | 105704362 | 6/1916 |
| CN | 105763795 | 7/1916 |

(Continued)

OTHER PUBLICATIONS

International Search Report and Written Opinion issued in Corresponding PCT Application No. PCT/CN2019/082007, dated May 29, 2019 (English translation provided).

*Primary Examiner* — Gevell V Selby
(74) *Attorney, Agent, or Firm* — Norton Rose Fulbright US LLP

(57) ABSTRACT

A variable magnification method, apparatus and a computer-readable storage medium is disclosed. The method comprises: acquiring angle parameters for the current position of a camera after receiving a variable magnification instruction; wherein, the variable magnification instruction is configured for instructing the camera to perform the variable magnification based on a target magnification ratio parameter; querying target historical focusing information based on the angle parameters for the current position, wherein, the target historical focusing information comprises a historical magnification ratio parameter and a historical in-focus parameter of the camera; querying a target variable magnification curve based on the historical magnification ratio parameter and the historical in-focus parameter; and controlling the camera to perform the variable magnification based on the target variable magnification curve.

9 Claims, 5 Drawing Sheets

(56) References Cited

FOREIGN PATENT DOCUMENTS

| | | |
|---|---|---|
| CN | 107071243 | 8/1917 |
| CN | 107490853 | 12/1917 |
| CN | 107664899 | 2/1918 |
| CN | 108076281 | 5/1918 |
| CN | 103841333 | 6/2014 |
| JP | 2015206961 | 11/2015 |

* cited by examiner

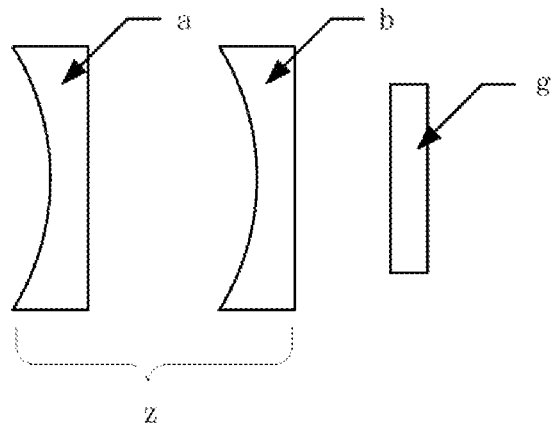

FIG. 1

```
┌─────────────────────────────────────────────────────────────────────┐
│ after receiving a variable magnification instruction, the camera acquires an │
│ angle parameter for a current position; wherein, the variable magnification  │──201
│ instruction is configured for instructing the camera to perform the variable │
│     magnification based on a target magnification ratio parameter            │
└─────────────────────────────────────────────────────────────────────┘
                                    ▼
┌─────────────────────────────────────────────────────────────────────┐
│  the camera acquires target historical focusing information based on the angle │
│     parameter for the current position; wherein, the target historical focusing│──202
│ information includes a historical magnification ratio parameter and a historical│
│                      in-focus parameter of the camera                          │
└─────────────────────────────────────────────────────────────────────┘
                                    ▼
┌─────────────────────────────────────────────────────────────────────┐
│      the camera acquires a target variable magnification curve based on the   │──203
│  historical magnification ratio parameter and the historical in-focus parameter│
└─────────────────────────────────────────────────────────────────────┘
                                    ▼
┌─────────────────────────────────────────────────────────────────────┐
│  in the process of performing the variable magnification based on the target  │──204
│   magnification ratio parameter, the camera performs the automatic focusing   │
│                   based on the target variable magnification curve            │
└─────────────────────────────────────────────────────────────────────┘
```

FIG. 2 ly of variable magnification curves pre-stored, thereby avoiding the phenomenon that the camera blurs pictures to a certain extent.

VARIABLE MAGNIFICATION METHOD AND CAMERA

CROSS REFERENCE TO RELATED APPLICATIONS

The present application is a national phase application under 35 U.S.C. § 371 of International Application No. PCT/CN2019/082007, filed Apr. 10, 2019, which claims the benefit of priority to Chinese patent application No. 201810550765.0, filed with China National Intellectual Property Administration on May 31, 2018, and entitled "Focusing method, Apparatus and Computer-readable Storage Medium", each of which are incorporated herein by reference in their entirety.

TECHNICAL FIELD

The present application relates to the technical field of monitoring, and in particular to a variable magnification method and camera.

BACKGROUND

In related technology, there may be a plurality of variable magnification curves pre-stored in a camera; each of the variable magnification curves corresponds to one object distance value and is configured for indicating a correspondence between in-focus parameters and magnification ratio parameters (magnification ratio for the variable magnification) at a corresponding object distance value. When performing variable magnification focusing, since the camera cannot typically determine the object distance value, the camera typically cannot acquire a real variable magnification curve from the plurality of variable magnification curves. In this case, the camera may select one preset variable magnification curve from the plurality of variable magnification curves and perform a coarse adjustment of the position of focusing lens-sheet based on the preset variable magnification curve and the magnification ratio for the variable magnification. After the coarse adjustment, the camera may acquire the definition of images captured by the lens at different positions of the focusing lens-sheet, and then perform a fine adjustment of the position of the focusing lens-sheet based on the definition, thereby completing automatic focusing.

However, in the actual application, since there may be a larger difference between the preset variable magnification curve and the real variable magnification curve, the camera may need to significantly change the position of the focusing lens-sheet during the fine adjustment, thus easily causing the phenomenon that the camera blurs pictures during focusing.

SUMMARY

The embodiments of the present application provide a variable magnification method and a camera, which can avoid the phenomenon that the camera blurs pictures to a certain extent. The technical solutions are as follows.

In a first aspect, a variable magnification method is provided. The method includes:

after receiving a variable magnification instruction, acquiring angle parameters for a current position of a camera; wherein, the variable magnification instruction is configured for instructing the camera to perform variable magnification based on a target magnification ratio parameter; the angle parameters for the current position includes a first angle of the camera in a horizontal direction and a second angle of the camera in a vertical direction;

querying historical focusing information corresponding to the angle parameters for the current position in a pre-stored focusing information correspondence table as target historical focusing information; wherein, the focusing information correspondence table stores at least one set of correspondence between angle parameters for a position and historical focusing information; the target historical focusing information includes a historical magnification ratio parameter and a historical in-focus parameter of the camera;

acquiring a target object distance value corresponding to the historical magnification ratio parameter and the historical in-focus parameter;

querying a target variable magnification curve corresponding to the target object distance value in a pre-stored correspondence between variable magnification curves and object distance values; and controlling the camera to perform the variable magnification based on the target variable magnification curve.

In a second aspect, a camera is provided. The camera includes a lens, an electrical motor and a microprocessor, wherein the lens includes a variable magnification lens-sheet; the electrical motor includes a variable magnification motor; the variable magnification motor is connected to the variable magnification lens-sheet; and the microprocessor is configured for:

after receiving a variable magnification instruction, acquiring the angle parameters for a current position of a camera; wherein, the variable magnification instruction is configured for instructing the camera to perform variable magnification based on a target magnification ratio parameter;

querying historical focusing information corresponding to the angle parameters for the current position in a pre-stored focusing information correspondence table as target historical focusing information; wherein, the focusing information correspondence table stores at least one set of correspondence between angle parameters for a position and historical in-focus information; the target historical focusing information includes a historical magnification ratio parameter and a historical in-focus parameter of the camera;

acquiring a target object distance value corresponding to the historical magnification ratio parameter and the historical in-focus parameter; querying a target variable magnification curve corresponding to the target object distance value in the pre-stored correspondence between variable magnification curves and object distance values; and controlling the variable magnification motor to drive the variable magnification lens-sheets to move to perform variable magnification based on the target variable magnification curve.

In a third aspect, a computer-readable storage medium is provided. The computer-readable storage medium stores a computer program; the computer program can, when executed by a processing component, implement the variable magnification method in the first aspect.

The angle parameters for the current position of the camera is acquired in the process of the variable magnification, the target historical focusing information is acquired based on the angle parameters for the current position, and then the target variable magnification curve is acquired based on the target historical focusing information, the camera can perform the automatic focusing based on the target variable magnification curve, so that the camera can determine the real variable magnification curve (i.e. the target variable magnification curve) from a plurality of variable magnification curves pre-stored on itself in the process of the variable magnification. In this way, the camera does not need to perform a fine adjustment of the distance between the lens and the photosensitive element based on the definition of the images in the process of the automatic focusing, which can avoid significant change of the distance between the lens and the photosensitive element in the process of the fine adjustment due to the large difference between the preset variable magnification curve and the real variable magnification curve, and thus avoid the phenomenon that the camera blurs pictures in the process of the variable magnification.

BRIEF DESCRIPTION OF THE DRAWINGS

In order to illustrate the technical solutions of the embodiments of the present application or of the prior art more clearly, the drawings to be used in the embodiments or the prior art description will be briefly described below. Obviously, the drawings in the following description are only for some embodiments of the application, and based on the drawings, those skilled in the art may also obtain other drawings without any creative efforts.

FIG. 1 exemplarily provides a structural schematic diagram of a camera.

FIG. 2 exemplarily provides a flowchart of a variable magnification method based on the camera shown in FIG. 1.

DETAILED DESCRIPTION

Figure 3:
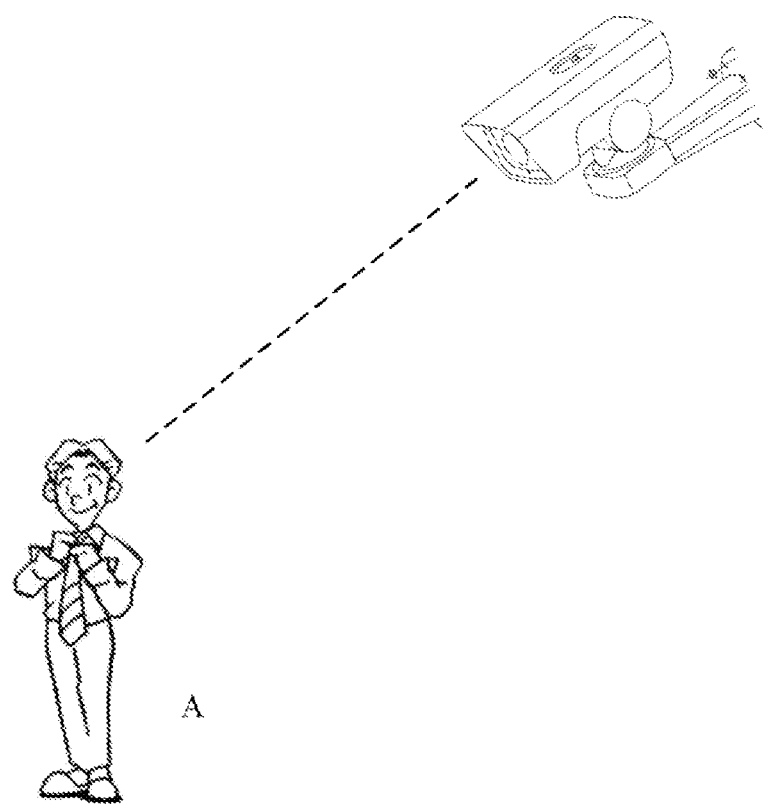
FIG. 3 exemplarily provides a schematic diagram of a scene where a camera captures at a certain moment.

In order to make the purpose, technical solutions and advantages of the present application more clear, the present application will further be described in detail with reference to the drawings and the embodiments. Obviously, the described embodiments are only a part of the embodiments of the present application, and not all of the embodiments. All other embodiments obtained by those skilled in the art based on the embodiments of the present application without any creative efforts fall within the scope of protection of the present application.

Currently, cameras capable of supporting a function for variable magnification focusing (hereinafter referred to as cameras) have become more and more common in people's daily lives. FIG. 1 is an exemplary structural schematic diagram of a camera. As shown in FIG. 1, the camera may include a lens z and a photosensitive element g (the photosensitive element g may be an image sensor, etc.); wherein, the lens z may include a variable magnification lens-sheet a and a focusing lens-sheet b. The variable magnification lens-sheet a may be driven by a variable magnification motor to move, to change the focal length of the lens z, thereby achieving the variable magnification of the camera. The focusing lens-sheet b may be driven by a focusing motor to move, to achieve the automatic focusing of the camera.

There may be a plurality of variable magnification curves pre-stored in the camera. Each of the variable magnification curves may correspond to one object distance value and may be configured for indicating a correspondence between in-focus parameters and magnification ratio parameters at a corresponding object distance value. Usually, the in-focus parameter may be the position of the focusing motor, and the magnification ratio parameter may be the position of the variable magnification motor. The camera may perform the variable magnification focusing based on the above-mentioned variable magnification curves.

In the prior art, the technical process that the camera performs the variable magnification focusing based on the variable magnification curves may be as follows.

The camera acquires a variable magnification instruction, and determines the position (hereafter referred to as a first position) of the variable magnification motor after the variable magnification based on the variable magnification instruction; the camera selects one preset variable magnification curve, which typically is a variable magnification curve corresponding to an infinitely large object distance value, from the plurality of variable magnification curves. The camera acquires the position (hereafter referred to as a second position) of the focusing motor corresponding to the first position in the preset variable magnification curve. Then, the camera controls the variable magnification motor to drive the variable magnification lens-sheet a to move, such that the variable magnification motor reaches the first position; and at the same time, the camera controls the focusing motor to drive the focusing lens-sheet b to move, such that the focusing motor reaches the second position; wherein, the process that the camera determines the second position and controls the focusing motor to reach the second position may be referred to as a process of a coarse adjustment of the automatic focusing. After the focusing motor reaches the second position, the camera may continuously drive the focusing motor and capture images at different positions of the focusing motor. The camera may calculate the definitions of the captured images and determine the position of the focusing motor corresponding to the image with the highest definition as the final position of the focusing motor. The camera controls the focusing motor to reach the final position of the focusing motor, thereby completing the variable magnification focusing; wherein, the process that the camera determines the final position of the focusing motor and controls the focusing motor to reach the final position of the focusing motor may be referred to as a process of the fine adjustment of the automatic focusing.

Typically, the above-mentioned preset variable magnification curve is not a real variable magnification curve, that is, the real object distance value is not infinitely large. At the same time, the difference between the preset variable magnification curve and the real variable magnification curve is likely to be great, as a result of which, after the camera controls the focusing motor to reach the second position, the camera may also need to significantly adjust the position of the focusing motor, such that the focusing motor reaches the above-mentioned final position of the focusing motor, which easily results in the phenomenon that the camera blurs pictures in the process of the variable magnification focusing.

In order to solve the above-mentioned problem, an embodiment of the present application provides a variable magnification method. FIG. 2 shows a flowchart of the variable magnification method, which may be applied to the camera with a variable magnification focusing function. As shown in FIG. 2, the variable magnification method may include the following steps.

At the step 201, after receiving a variable magnification instruction, the camera acquires angle parameters for a current position; wherein, the variable magnification instruction is configured for instructing the camera to perform the variable magnification based on a target magnification ratio parameter.

At the step 202, the camera acquires target historical focusing information based on the angle parameters for the current position; wherein, the target historical focusing information includes a historical magnification ratio parameter and a historical in-focus parameter of the camera.

The step 202 may include: querying historical focusing information corresponding to the angle parameters for the current position in a pre-stored focusing information correspondence table as target historical focusing information; wherein, the focusing information correspondence table stores at least one set of correspondence between angle parameters for a position and historical focusing information; the target historical focusing information includes the historical magnification ratio parameter and the historical in-focus parameter of the camera.

At the step 203, the camera acquires a target variable magnification curve based on the historical magnification ratio parameter and the historical in-focus parameter.

The step 203 may include: acquiring a target object distance value corresponding to the historical magnification ratio parameter and the historical in-focus parameter; querying the target variable magnification curve corresponding to the target object distance value in the pre-stored correspondence between variable magnification curves and object distance values At the step 204, in the process of performing the variable magnification based on the target magnification ratio parameter, the camera performs the automatic focusing based on the target variable magnification curve.

The step 204 may include: controlling the camera to perform the variable magnification based on the target variable magnification curve. Furthermore, the step 204 may also include: in the process of controlling the camera to perform the variable magnification based on the target variable magnification curve, controlling the camera to perform the automatic focusing based on the target variable magnification curve.

The variable magnification can be understood as the adjustment of the focus length; generally, in the process of focusing, the focus point and the focus length are needed to be adjusted at the same time; in this embodiment, it is possible to perform the variable magnification and also perform the automatic focusing by using the target variable magnification curve.

In summary, in the variable magnification method provided by the embodiment of the present application, by acquiring the angle parameters for the current position of the camera in the process of the variable magnification focusing, acquiring the target historical focusing information based on the angle parameters for the current position, and then acquiring the target variable magnification curve based on the target historical focusing information, the camera can perform the automatic focusing based on the target variable magnification curve, so that the camera can determine the real variable magnification curve (i.e. the target variable magnification curve) from a plurality of variable magnification curves pre-stored on itself in the process of the variable magnification focusing. In this way, the camera does not need to perform a fine adjustment of the distance between the lens and the photosensitive element based on the definition of the images in the process of the automatic focusing, which can avoid significant change of the distance between the lens and the photosensitive element in the process of the fine adjustment due to the large difference between the preset variable magnification curve and the real variable magnification curve, and thus avoid the phenomenon that the camera blurs pictures in the process of the variable magnification focusing.

For example, in the step 201, the camera may receive a variable magnification instruction when capturing a video; wherein, the variable magnification instruction may carry a target magnification ratio parameter, and may instruct the camera to perform the variable magnification based on the target magnification ratio parameter; wherein, the target magnification ratio parameter is the ratio of the focal length after the variable magnification to a minimum focal length. Since the focal length of the camera is related to the position of the variable magnification motor in the camera, and the target magnification ratio parameter may indicate the position of the variable magnification motor in the camera after the variable magnification, which position of the variable magnification motor may be adjusted based on the target magnification ratio parameter.

In the step 201, the camera acquires the angle parameters for the current position; wherein, the angle parameters for the current position refers to an angle of rotation of the camera at the current position relative to at a preset reference position.

The camera related to the embodiment of the present application may be a PTZ (Pan/Tilt/Zoom) camera. The PTZ camera may rotate by 360° in the horizontal direction and may rotate downwardly by 90° in the vertical direction. When the camera related to the embodiment of the present application is a PTZ camera, angle parameters for the current position acquired by the PTZ camera in step 201 may include a first angle and a second angle; wherein, the first angle is an angle of rotation of the PTZ camera at the current position relative to at a preset horizontal reference position in the horizontal direction, and the second angle is an angle of rotation of the PTZ camera at the current position relative to at a preset vertical reference position in the vertical direction.

Of course, the camera related to the embodiment of the present application may be a fixing camera without rotation function. When the camera related to the embodiment of the present application is a fixing camera, the fixing camera may acquire a fixing value as the angle parameter for the current position in the step 201.

In the step 202, the camera acquires the target historical focusing information based on the angle parameter for the current position.

Wherein, the target historical focusing information may include a historical magnification ratio parameter and a historical in-focus parameter; wherein, the historical magnification ratio parameter and the historical in-focus parameter correspond to each other; the magnification ratio parameter may indicate the final position of the variable magnification motor in the process of the variable magnification focusing; and the in-focus parameter may indicate the final position of the focusing motor in the process of the variable magnification focusing.

In the following, the embodiment of the present application will explain the technical process that the camera acquires the target historical focusing information based on the angle parameter for the current position.

For the fixing camera without rotation function, as above described, the fixing camera acquires a fixing value as the angle parameter for the current position; in this case, the fixing camera may query a focusing information correspondence table based on the fixing value; wherein, the focusing information correspondence table stores at least one set of correspondence between an angle parameter for a position and historical focusing information; when there is a correspondence between the fixing value and the historical focusing information stored in the focusing information correspondence table, the fixing camera acquires the historical focusing information corresponding to the fixing value as the target historical focusing information; when there is not the correspondence between the fixing value and the historical focusing information stored in the focusing information correspondence table, the fixing camera performs the step A1; wherein, the step A1 may be as follows:

the fixing camera performs the variable magnification based on the target magnification ratio parameter, and in the process of the variable magnification, performs the process of the coarse adjustment of the automatic focusing based on the preset variable magnification curve, and performs the process of the fine adjustment of the automatic focusing based on the definition of images captured by the fixing camera; after the process of the fine adjustment of the automatic focusing, the fixing camera may acquire its own current in-focus parameter, wherein the current in-focus parameter may indicate the current position of the focusing motor in the fixing camera, and then the fixing camera may store the in-focus parameter, the target magnification ratio parameter and the fixing value in the focusing information correspondence table in correspondence to each other, wherein, the in-focus parameter and the target magnification ratio parameter may be collectively referred to as focusing information.

It should be noted that, the process of the coarse adjustment of the automatic focusing and the process of the fine adjustment of the automatic focusing in the step A1 are similar to the process of the coarse adjustment and the process of the fine adjustment above-mentioned, which will be not repeated in the embodiment of the present application.

For the PTZ camera, the technical process may include the step A2 to the step D2.

At step A2, the PTZ camera queries the preset focusing information correspondence table based on angle parameters for the current position; when there is the historical focusing information corresponding to the angle parameters for the current position stored in the focusing information correspondence table, the PTZ camera perform the step B2; when there is not the historical focusing information corresponding to the angle parameters for the current position, the PTZ camera performs the steps C2 and D2.

Wherein, the technical process that the PTZ camera queries the pre-stored focusing information correspondence table based on the angle parameters for the current position may be that:

the PTZ camera acquires the angle range corresponding to angle parameters for the current position; wherein, the angle range may include a vertical angle sub-range and a horizontal angle sub-range; wherein, the vertical angle sub-range is an angle range in which the second angle is located, and the horizontal angle sub-range is an angle range in which the first angle is located;

or, the PTZ camera may determine the horizontal angle sub-range in which the first angle is located in the focusing information correspondence table as a horizontal angle sub-range to be queried, and determine the vertical angle sub-range in which the second angle is located in the focusing information correspondence table as a vertical angle sub-range to be queried; the horizontal angle sub-range to be queried and the vertical angle sub-range to be queried constitute the above-mentioned angle range corresponding to the angle parameters for the current position.

For example, the angle parameters for the current position of the PTZ camera are: the first angle of 180° and the second angle of 45°, wherein the angle range in which 180° is located is [180°, 200° ], and the angle range in which 45° is located is [40°, 60° ], so the angle range corresponding to the angle parameters for the current position of the PTZ camera includes: a vertical angle sub-range [40°, 60° ] and a horizontal angle sub-range [180°, 200° ]; for the convenience of description, the vertical angle sub-range [40°, 60° ] is referred to as the horizontal sub-range to be queried, and the horizontal angle sub-range [180°, 200° ] is referred to as the vertical sub-range to be queried.

After the angle range corresponding to the angle parameters for the current position is acquired, the PTZ camera may query the focusing information correspondence table based on the angle range; wherein the focusing information correspondence table stores at least one set of correspondence between the angle range and the historical focusing information. That is to say, in the focusing information correspondence table, the historical focusing information corresponding to the horizontal angle sub-range to be queried and the vertical angle sub-range to be queried is queried as the target historical focusing information.

When there is the historical focusing information corresponding to the angle range corresponding to the angle parameters for the current position stored in the focusing information correspondence table, the PTZ camera performs the step B2; when there is not the historical focusing information corresponding to the angle range corresponding to the angle parameters for the current position stored in the focusing information correspondence table, the PTZ camera performs the steps C2 and D2.

An exemplary focusing information correspondence table is shown in table 1. As shown in the table 1, it is assumed that an angle range includes a "vertical angle sub-range [0°, 20° ]" and a "horizontal angle sub-range [0°, 20° ]", the historical focusing information corresponding to the angle range is: a historical magnification ratio parameter a and a historical in-focus parameter b.

TABLE 1

| Angle range | | Historical focusing information | |
| --- | --- | --- | --- |
| Vertical angle sub-range | Horizontal angle sub-range | Historical magnification ratio parameter | Historical in-focus parameter |
| [0°, 20°] | [0°, 20°] | a | b |
| [0°, 20°] | (20°, 40°] | c | d |
| ... | ... | ... | ... |
| [70°, 90°] | [340°, 360°] | g | h |

In an implementation, the technical process that the PTZ camera acquires the angle range corresponding to the angle parameters for the current position may be that: the PTZ camera queries a pre-stored horizontal angle range correspondence table based on the first angle; wherein, the horizontal angle range correspondence table stores at least one set of the correspondence between the angle of horizontal rotation and the angle range; and the PTZ camera acquires the angle range, corresponding to the first angle, stored in the horizontal angle range correspondence table as the horizontal angle sub-range. Similarly, the PTZ camera queries a pre-stored vertical angle range correspondence table based on the second angle; wherein, the vertical angle range correspondence table stores at least one set of the correspondence between the angle of vertical rotation and the angle range, and the PTZ camera acquires the angle range, corresponding to the second angle, stored in the vertical angle range correspondence table as the vertical angle sub-range; and then the PTZ camera may acquires the horizontal angle sub-range and the vertical angle sub-range as the angle range corresponding to the angle parameters for the current position.

An exemplary horizontal angle range correspondence table and vertical angle range correspondence table are shown in table 2 and table 3. As shown in table 2, when the first angle is 5°, the horizontal angle sub-range is [0°, 20° ]; when the second angle is 5.5°, the vertical angle sub-range is [0°, 20° ].

TABLE 2

| Angle of horizontal rotation | Angle range |
|---|---|
| 5° | [0°, 20°] |
| 5.5° | [0°, 20°] |
| ... | ... |
| 361° | [340°, 360°] |

TABLE 3

| Angle of vertical rotation | Angle range |
|---|---|
| 5° | [0°, 20°] |
| 5.5° | [0°, 20°] |
| ... | ... |
| 89° | [70°, 90°] |

For example, the above-mentioned angle range can be indicated by using angle range identifiers; in this case, there may be at least one set of correspondence between the angle of horizontal rotation and a horizontal angle sub-range identifier stored in the horizontal angle range correspondence table, and the at least one set of correspondence between the angle of vertical rotation and a vertical angle sub-range identifier stored in the vertical angle range correspondence table; thus, the angle range identifiers configured for indicating the above-mentioned angle range may include a horizontal angle sub-range identifier and a vertical angle sub-range identifier; furthermore, the focusing information correspondence table may include at least one set of correspondence between the angle range identifiers and the historical focusing information.

Using angle range identifiers to indicate the above-mentioned angle range may simplify the content stored in the focusing information correspondence table, the horizontal angle range correspondence table and the vertical angle range correspondence table, and may accelerate the speed of querying the focusing information correspondence table.

At step B2, the PTZ camera acquires the historical focusing information corresponding to the angle parameters for the current position as the target historical focusing information.

That is to say, the PTZ camera acquires the historical focusing information corresponding to the angle range corresponding to the angle parameters for the current position stored in the focusing information correspondence table as the target historical focusing information.

At step C2, the PTZ camera determines the target angle range; wherein, the difference between the target angle range and the angle range corresponding to the angle parameters for the current position is less than a preset threshold. The difference between the angle ranges may be the difference between the minimum values in the angle ranges, or the difference between the maximum values in the angle ranges, or the difference between the middle values in the angle ranges, which is not specifically limited.

In one case, the above-mentioned target angle range may include a first angle range and a second angle range; wherein the first angle range may include a first target vertical angle sub-range and a first target horizontal angle sub-range; and the second angle range may include a second target vertical angle sub-range and a second target horizontal angle sub-range. In the following, in the embodiment of the present application, the technical process that the PTZ camera determines the first angle range and the technical process that the PTZ camera determines the second angle range will be explained, respectively.

The technical process that the PTZ camera determines the first angle range is as follows.

At step a1, the PTZ camera determines an angle sub-range adjacent to the above-mentioned vertical angle sub-range.

The so-called "adjacent angle sub-ranges" means that the upper bound of one of the two angle sub-ranges is the same as the lower bound of the other angle sub-range. For example, for an angle sub-range of 20° to 30°, the adjacent angle sub-ranges may be an angle sub-range of 10° to 20° (the upper bound thereof is the same as the lower bound of the angle sub-range of 20° to 30°) and an angle sub-range of 30° to 40° (the lower bound thereof is the same as the upper bound of the angle sub-range of 20° to 30°).

At step b1, the PTZ camera determines the angle sub-range adjacent to the vertical angle sub-range as the first target vertical angle sub-range in the first angle range.

As described above, a certain angle sub-range may usually be adjacent to two angle sub-ranges. Therefore, the PTZ camera may usually determine two first target vertical angle sub-ranges in the step b1.

At step c1, the PTZ camera determines the above-mentioned horizontal angle sub-range as the first target horizontal angle sub-range in the first angle range.

At step d1, the PTZ camera determines the first angle range based on the first target vertical angle sub-range and the first target horizontal angle sub-range.

In the step b1, the PTZ camera may typically determine two first target vertical angle sub-ranges. In this way, the PTZ camera may typically determine two first angle ranges in the step d1.

The technical process that the PTZ camera determines the second angle range is as follows.

At step a2, the PTZ camera determines an angle sub-range adjacent to the above-mentioned horizontal angle sub-range.

At step b2, the PTZ camera determines the angle sub-range adjacent to the horizontal angle sub-range as a second target horizontal angle sub-range in the second angle range.

At step c2, the PTZ camera determines the above-mentioned vertical angle sub-range as the second target vertical angle sub-range in the second angle range.

At step d2, the PTZ camera determines the second angle range based on the second target vertical angle sub-range and the second target horizontal angle sub-range.

Similarly, the PTZ camera may typically determine two second angle ranges in the step d2.

At step D2, the PTZ camera queries the focusing information correspondence table based on the target angle range.

Wherein, the technical process that the PTZ camera queries the focusing information correspondence table based on the target angle range may include steps as follows.

At step a3, the PTZ camera queries the focusing information correspondence table based on the first angle range; when there is the historical focusing information corresponding to the first angle range stored in the focusing information correspondence table, the PTZ camera acquires the historical focusing information corresponding to the first angle range as the target historical focusing information; and when there is not the historical focusing information corresponding to the first angle range stored in the focusing information correspondence table, the PTZ camera performs the step b3.

At step b3, the PTZ camera queries the focusing information correspondence table based on the second angle range; when there is the historical focusing information corresponding to the second angle range stored in the focusing information correspondence table, the PTZ camera acquires the historical focusing information corresponding to the second angle range as the target historical focusing information; when there is not the historical focusing information corresponding to the second angle range stored in the focusing information correspondence table, the PTZ camera determines that there is not the historical focusing information corresponding to the target angle range stored in the focusing information correspondence table.

When there is not the historical focusing information corresponding to the target angle range stored in the focusing information correspondence table, the PTZ camera performs the variable magnification based on the target magnification ratio parameter, and in the process of the variable magnification, the PTZ camera completes the process of the coarse adjustment of the automatic focusing based on the preset variable magnification curve and completes the process of the fine adjustment of the automatic focusing based on the definition of images captured by the PTZ camera. After the process of the fine adjustment of the automatic focusing, the PTZ camera may acquire its own current in-focus parameter, wherein, the current in-focus parameter may indicate the current position of the focusing motor in the PTZ camera, and then the PTZ camera may store the in-focus parameter, the target magnification ratio parameter and the angle parameters for the current position in the focusing information correspondence table in correspondence to each other, wherein the in-focus parameter and the target magnification ratio parameter may be collectively referred to as the focusing information.

Or, in an implementation, if the historical focusing information corresponding to the angle parameters for the current position is not found in the focusing information correspondence table, the first angle range is determined in the focusing information correspondence table, wherein, the first angle range includes the first target vertical angle sub-range and the first target horizontal angle sub-range, the first target vertical angle sub-range is adjacent to the vertical angle sub-range, and the first target horizontal angle sub-range is identical to the horizontal angle sub-range; and the historical focusing information corresponding to the first angle range is acquired as the target historical focusing information.

In another implementation, if the first angle range is not determined in the focusing information correspondence table, the second angle range then is determined, wherein the second angle range includes the second target vertical angle sub-range and the second target horizontal angle sub-range, the second target horizontal angle sub-range is adjacent to the horizontal angle sub-range, and the second target vertical angle sub-range is identical to the vertical angle sub-range; and the historical focusing information corresponding to the second angle range is acquired as the target historical focusing information.

In the step 203, the camera acquires the target variable magnification curve based on the historical magnification ratio parameter and the historical in-focus parameter.

After acquiring the target historical focusing information, the camera may acquire an target object distance value corresponding to the historical magnification ratio parameter and the historical in-focus parameter included in the target historical focusing information; in an embodiment of the present application, the camera may store an object distance value correspondence table that stores at least one set of correspondence between the magnification ratio parameter, the in-focus parameter and the object distance value, the camera may query the object distance value correspondence table based on the historical magnification ratio parameter and the historical in-focus parameter to acquire the target object distance value. In another embodiment of the present application, the camera may calculate the target object distance value corresponding to the historical magnification ratio parameter and the historical in-focus parameter by a preset formula of calculation of object distance value.

After acquiring the target object distance value, the camera may acquire a target variable magnification curve from the plurality of variable magnification curves pre-stored in the camera based on the target object distance value; wherein the target variable magnification curve corresponds to the target object distance value.

Figure 4:
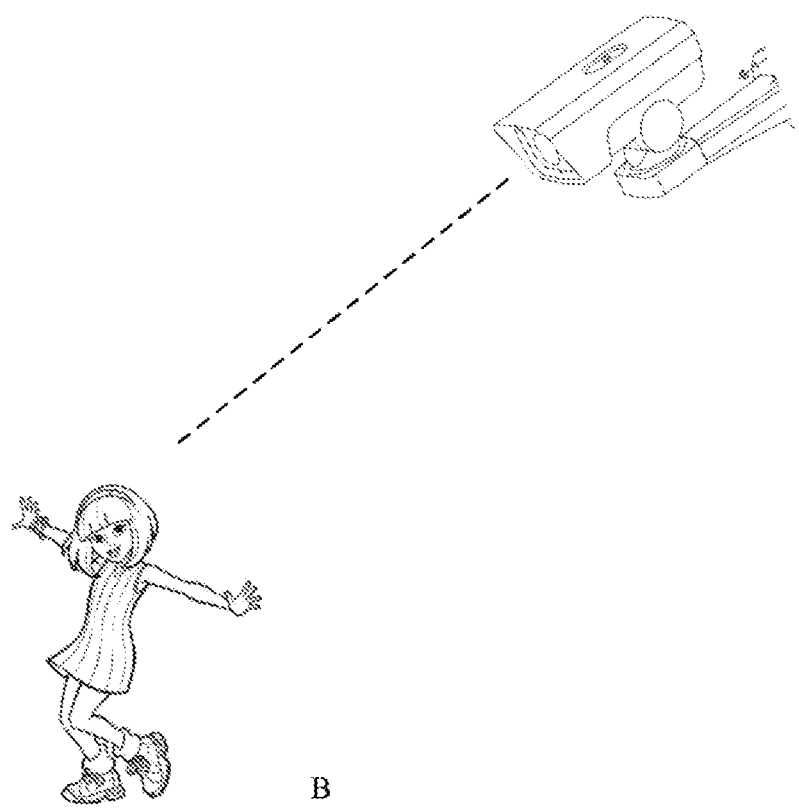
FIG. 4 exemplarily provides a schematic diagram of a scene where the camera captures at another moment different from the moment in FIG. 3.

Generally, since the position where the camera is installed is often fixed, the distance between the object captured by the camera at the same angle of rotation and the camera often does not change much, that is, the object distance values of the camera at the same angle of rotation do not change much. For example, as shown in FIG. 3, the camera rotates at an angle of 180° horizontally and 45° vertically at a certain moment. At this time, the object captured by the camera is person A. As shown in FIG. 4, the camera also rotates at an angle of 180° horizontally and 45° vertically at another moment; at this time, the object captured by the camera is person B. The position where the camera is installed is generally high, and the height of the human body has little effect on the distance between the camera and the human body; therefore, it can be considered that the distance between the camera and the person A in FIG. 3 is not much different from the distance between the camera and the person B in FIG. 4, that is, the object distance values of the cameras in FIGS. 3 and 4 are not much different.

Since the change in the object distance values of the camera at the same angle of rotation is little, the real variable magnification curves of the camera performing the variable magnification focusing at the same angle of rotation are likely to be the same or similar. For example, the real variable magnification curve of the camera performing the variable magnification focusing in FIG. 3 is w1, which corresponds to the object distance value of the camera in FIG. 3, and the real variable magnification curve of the camera performing the variable magnification focusing in FIG. 4 is w2, which corresponds to the object distance value of the camera in FIG. 4; the object distance values of the camera in FIGS. 3 and 4 are not much different; and the real variable magnification curve w1 is also very similar to the real variable magnification curve w2.

Since the real variable magnification curves of the camera performing the variable magnification focusing at the same angle of rotation are likely to be the same or similar, the target variable magnification curve determined in the step 203 is the real variable magnification curve of the camera at the same angle of rotation or the similar angle in the historical focusing process. Therefore, compared with performing the variable magnification focusing by using a preset variable magnification curve much different from the real variable magnification curve in the prior art, in the embodiment of the present application, the camera uses the target variable magnification curve to perform the variable magnification focusing, which may avoid the phenomenon that the camera blurs pictures in the process of the variable magnification focusing to a certain extent.

In the step 204, in the process of performing the variable magnification based on the target magnification ratio parameter, the camera may perform the automatic focusing based on the target variable magnification curve.

In the process of the camera performing the variable magnification based on the target magnification ratio parameter, the camera may acquire its own real-time magnification ratio parameter; and then the camera may acquire a real-time in-focus parameter corresponding to the real-time magnification ratio parameter based on the real-time magnification ratio parameter and the target variable magnification curve, and the camera may perform the automatic focusing based on the real-time in-focus parameter.

In summary, in the variable magnification method provided by the embodiment of the present application, by acquiring the angle parameter for the current position of the camera in the process of the variable magnification focusing, acquiring the target historical focusing information based on the angle parameter for the current position, and then acquiring the target variable magnification curve based on the target historical focusing information, the camera then can perform the automatic focusing based on the target variable magnification curve, so that the camera can determine the real variable magnification curve (i.e. the target variable magnification curve) from a plurality of variable magnification curves pre-stored on itself in the process of the variable magnification focusing. In this way, the camera does not need to perform a fine adjustment of the distance between the lens and the photosensitive element based on the definition of the images in the process of the automatic focusing, which can avoid significant change of the distance between the lens and the photosensitive element in the process of the fine adjustment due to the large difference between the preset variable magnification curve and the real variable magnification curve, and thus avoid the phenomenon that the camera blurs pictures in the process of the variable magnification focusing to a certain extent.

Figure 5:
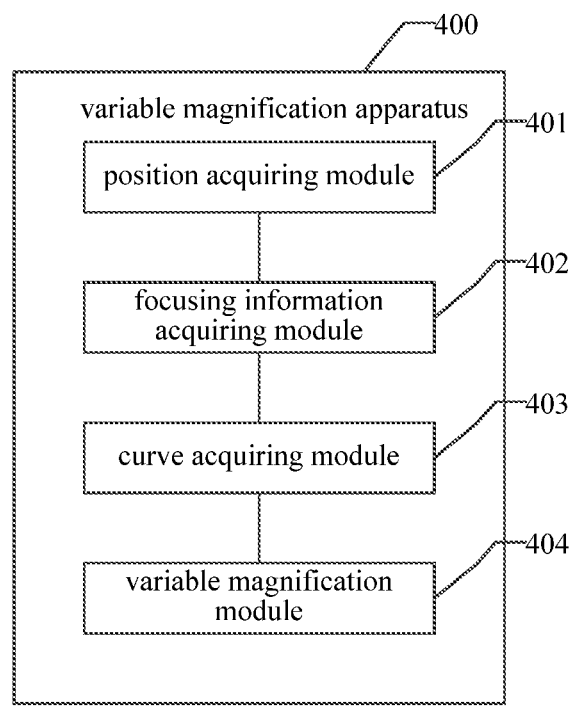
FIG. 5 exemplarily provides a virtual software block diagram of a variable magnification apparatus.

An embodiment of the present application provides a variable magnification apparatus 400. FIG. 5 shows the block diagram of the variable magnification apparatus 400. As shown in FIG. 5, the variable magnification apparatus 400 may include: a position acquiring module 401, a focusing information acquiring module 402, a curve acquiring module 403 and a variable magnification module 404.

The position acquiring module 401 is configured for: after receiving a variable magnification instruction, acquiring angle parameters for a current position of a camera; wherein, the variable magnification instruction is configured for instructing the camera to perform variable magnification based on a target magnification ratio parameter.

The focusing information acquiring module 402 is configured for: acquiring target historical focusing information based on the angle parameters for the current position; wherein, the target historical focusing information includes a historical magnification ratio parameter and a historical in-focus parameter of the camera.

The focusing information acquiring module 402 may be specifically configured for: querying historical focusing information corresponding to the angle parameters for the current position in a pre-stored focusing information correspondence table as target historical focusing information; wherein, the focusing information correspondence table stores at least one set of correspondence between an angle parameter for a position and historical in-focus information; the target historical focusing information includes a historical magnification ratio parameter and a historical in-focus parameter of the camera.

The curve acquiring module 403 is configured for: acquiring the target variable magnification curve based on the historical magnification ratio parameter and the historical in-focus parameter.

The curve acquiring module 403 may be specifically configured for: acquiring a target object distance value corresponding to the historical magnification ratio parameter and the historical in-focus parameter; querying a target variable magnification curve corresponding to the target object distance value in the pre-stored correspondence between variable magnification curves and object distance values.

The variable magnification module 404 is configured for: controlling the camera to perform automatic focusing based on the target variable magnification curve in the process that the camera performs the variable magnification based on the target magnification ratio parameter.

The variable magnification module 404 is configured for: controlling the camera to perform the variable magnification based on the target variable magnification curve; furthermore, the variable magnification module may be configured for: controlling the camera to perform the automatic focusing based on the target variable magnification curve in the process of controlling the camera to perform the variable magnification based on the target variable magnification curve.

In an embodiment of the present application, the focusing information acquiring module 402 is configured for: querying the focusing information correspondence table based on the angle parameters for the current position, wherein, the focusing information correspondence table stores at least one set of correspondence between an angle parameter for a position and historical focusing information; when there is the historical focusing information corresponding to the angle parameters for the current position stored in the focusing information correspondence table, acquiring the historical focusing information corresponding to the angle parameters for the current position as the target historical focusing information.

In an embodiment of the present application, the angle parameters for the current position includes a first angle of the camera in the horizontal direction and a second angle of the camera in the vertical direction; the focusing information acquiring module 402 is configured for: acquiring the angle range corresponding to the angle parameters for the current position; wherein, the angle range includes a vertical angle sub-range and a horizontal angle sub-range; wherein the vertical angle sub-range is an angle range in which the second angle is located, and the horizontal angle sub-range is an angle range in which the first angle is located; and querying the focusing information correspondence table based on the angle range corresponding to the angle parameters for the current position, wherein, the focusing information correspondence table records at least one set of correspondence between an angle range and historical focusing information.

In an embodiment of the present application, the angle range is indicated by an angle range identifier, and the focusing information correspondence table is a table of at least one set of correspondence between an angle range identifier and historical focusing information.

In an embodiment of the present application, the focusing information acquiring module 402 is configured for: determining the target angle range, when there is not the historical focusing information corresponding to the angle range corresponding to the angle parameters for the current position stored in the focusing information correspondence table, wherein, the difference between the target angle range and the angle range corresponding to the angle parameters for the current position is less than a preset threshold; and acquiring the historical focusing information corresponding to the target angle range as the target historical focusing information, when there is the historical focusing information corresponding to the target angle range stored in the focusing information correspondence table.

In an embodiment of the present application, the target angle range includes the first angle range; the focusing information acquiring module 402 is configured for: determining a first angle range; wherein, the first angle range includes a first target vertical angle sub-range and a first target horizontal angle sub-range; the first target vertical angle sub-range is adjacent to the vertical angle sub-range; the first target horizontal angle sub-range is identical to the horizontal angle sub-range.

In an embodiment of the present application, the target angle range further includes a second angle range, the focusing information acquiring module 402 is configured for: acquiring the second angle range; wherein, the second angle range includes a second target vertical angle sub-range and a second target horizontal angle sub-range; the second target horizontal angle sub-range is adjacent to the horizontal angle sub-range; the second target vertical angle sub-range is identical to the vertical angle sub-range.

In an embodiment of the present application, the focusing information acquiring module 402 is configured for: determining whether there is the historical focusing information corresponding to the first angle range stored in the focusing information correspondence table; when there is the historical focusing information corresponding to the first angle range stored in the focusing information correspondence table, acquiring the historical focusing information corresponding to the first angle range as the target historical focusing information; when there is not the historical focusing information corresponding to the first angle range stored in the focusing information correspondence table, determining whether there is the historical focusing information corresponding to the second angle range stored in the focusing information correspondence table; when there is the historical focusing information corresponding to the second angle range stored in the focusing information correspondence table, acquiring the historical focusing information corresponding the second angle range as the target historical focusing information.

In an embodiment of the present application, the camera stores a set of variable magnification curves; the set of variable magnification curves includes a plurality of variable magnification curves; and each of the plurality of variable magnification curves corresponds to one object distance value; the curve acquiring module 403 is configured for: acquiring the target object distance value corresponding to the historical magnification ratio parameter and the historical in-focus parameter; and acquiring the target variable magnification curve from the set of variable magnification curves based on the target object distance value, wherein, the target variable magnification curve corresponds to the target object distance value.

In an embodiment of the present application, the target variable magnification curve is configured for indicating a correspondence between variable magnification parameters and in-focus parameters; the variable magnification module 404 is configured for: acquiring the real-time magnification ratio parameter of the camera in the process that the camera performs the variable magnification based on the target magnification ratio parameter; acquiring a real-time in-focus parameter corresponding to the real-time magnification ratio parameter based on the real-time magnification ratio parameter and the target variable magnification curve; and controlling the camera to perform the automatic focusing based on the real-time in-focus parameter.

Figure 6:
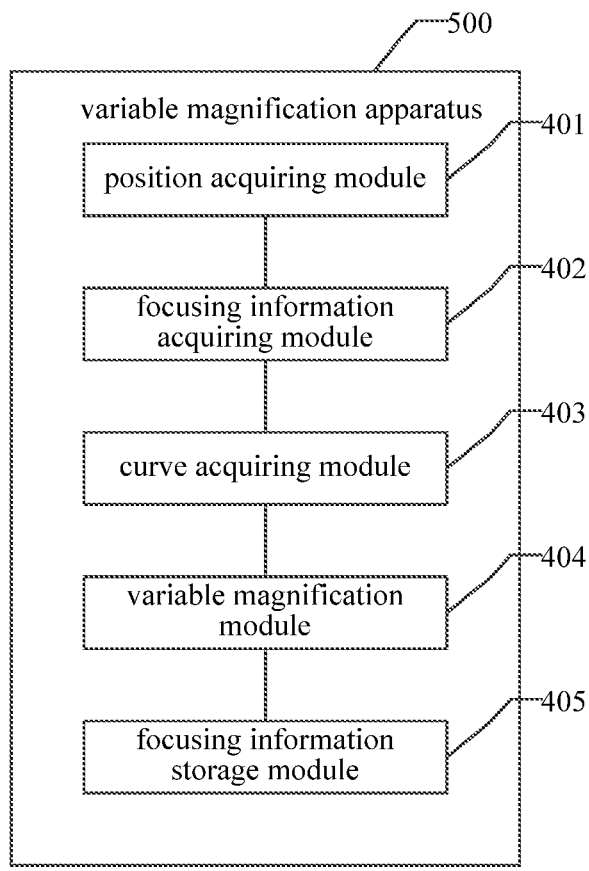
FIG. 6 exemplarily provides a virtual software block diagram of another variable magnification apparatus.

An embodiment of the present application further provides another variable magnification apparatus 500. As shown in FIG. 6, the variable magnification apparatus 500 further includes a focusing information storage module 405, in addition to the various modules of the variable magnification apparatus 400.

The focusing information storage module 405 is configured for: performing the variable magnification based on the target magnification ratio parameter when there is not the historical focusing information corresponding to the target angle range stored in the focusing information correspondence table; in the process of performing the variable magnification based on the target magnification ratio parameter, controlling the camera to perform the focusing based on the preset variable magnification curve and the definition of images captured by the camera; acquiring an in-focus parameter of the camera when the focusing is completed; and storing the in-focus parameter, the target magnification ratio parameter and the angle parameters for the current position in the focusing information correspondence table in correspondence to each other.

As an implementation, the focusing information correspondence table records at least one set of correspondence between the angle range and the historical focusing information, wherein, the angle range includes a vertical angle sub-range and a horizontal angle sub-range; the focusing information acquiring module 402 is specifically configured for: determining the horizontal angle sub-range in which the first angle is located in the focusing information correspondence table as a horizontal angle sub-range to be queried, and determining the vertical angle sub-range in which the second angle is located in the focusing information correspondence table as a vertical angle sub-range to be queried; and in the focusing information correspondence table, querying historical focusing information corresponding to the horizontal angle sub-range to be queried and the vertical angle sub-range to be queried as target historical focusing information.

As an implementation, the apparatus further includes:
a first determination module, configured for: in the case where the historical focusing information corresponding to the angle parameters for the current position is not found in the focusing information correspondence table, determining the first angle range in the focusing information correspondence table; wherein, the first angle range includes the first target vertical angle sub-range and the first target horizontal angle sub-range, the first target vertical angle sub-range is adjacent to the vertical angle sub-range, and the first target horizontal angle sub-range is identical to the horizontal angle sub-range; and acquiring the historical focusing information corresponding to the first angle range as the target historical focusing information.

As an implementation, the apparatus further includes:

a second determination module, configured for: in the case where the first angle range is not determined in the focusing information correspondence table, determining the second angle range; wherein the second angle range includes the second target vertical angle sub-range and the second target horizontal angle sub-range, the second target horizontal angle sub-range is adjacent to the horizontal angle sub-range, and the second target vertical angle sub-range is identical to the vertical angle sub-range; and acquiring the historical focusing information corresponding to the second angle range as the target historical focusing information.

In summary, the variable magnification apparatus provided by the embodiment of the present application, acquires the angle parameters for the current position of the camera in the process of the variable magnification focusing, acquires the target historical focusing information based on the angle parameters for the current position, and then acquires the target variable magnification curve based on the target historical focusing information, and the camera can perform the automatic focusing based on the target variable magnification curve, so that the camera can determine the real variable magnification curve (i.e. the target variable magnification curve) from a plurality of variable magnification curves pre-stored on itself in the process of the variable magnification focusing. In this way, the camera does not need to perform a fine adjustment of the distance between the lens and the photosensitive element based on the definition of the images in the process of the automatic focusing, which can avoid significant change of the distance between the lens and the photosensitive element in the process of the fine adjustment due to the large difference between the preset variable magnification curve and the real variable magnification curve, and thus avoid the phenomenon that the camera blurs pictures in the process of the variable magnification focusing.

Figure 7:
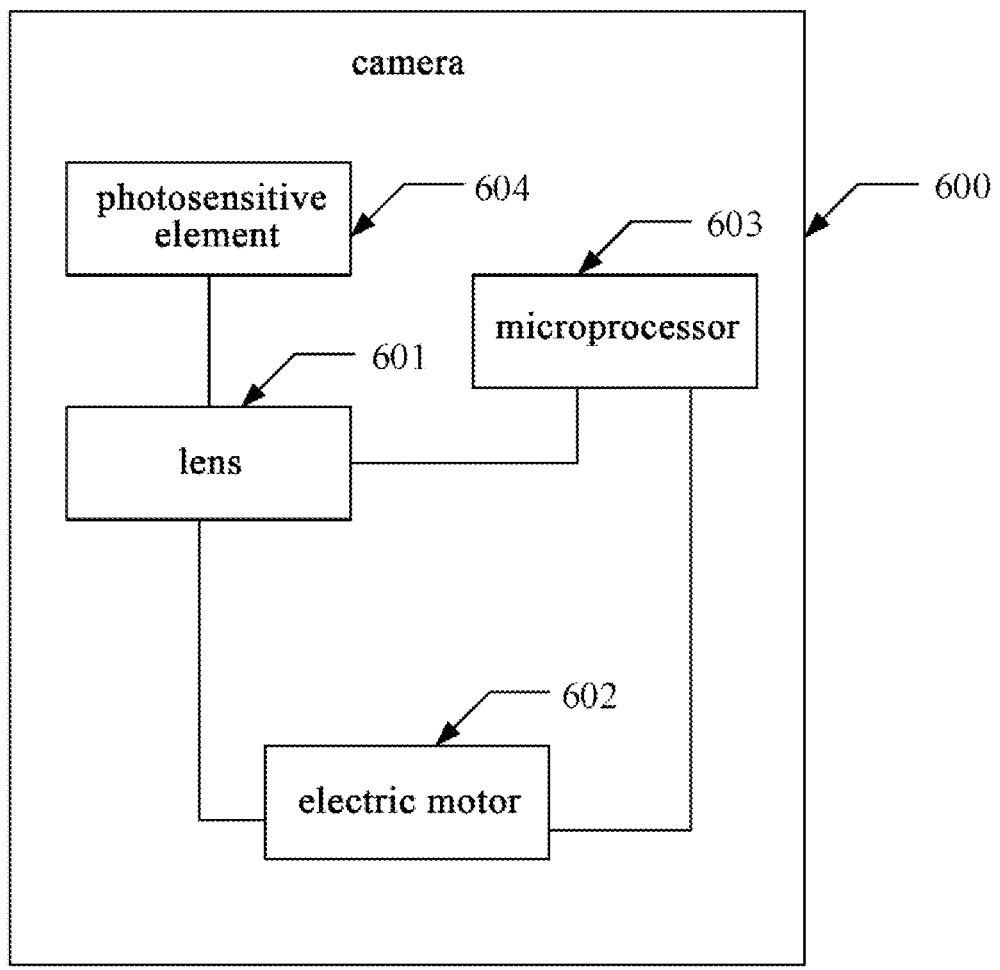
FIG. 7 exemplarily provides a hardware block diagram of a camera.

FIG. 7 is a schematic structural diagram of the camera 600 provided in the embodiment of the present application. The camera 600 includes a lens 601, an electric motor 602, a microprocessor 603 and a photosensitive element 604; wherein the lens 601 includes a variable magnification lens-sheet and a focusing lens-sheet; the electric motor 602 includes a variable magnification motor and a focusing motor; wherein the variable magnification motor is connected to the variable magnification lens-sheet and the focusing motor is connected to the focusing lens-sheet; the microprocessor 603 is configured for processing the video data captured by the lens 601; and at the same time, the microprocessor 603 is also configured for implementing the variable magnification method provided by the embodiment of the present application.

The microprocessor 603 may control the variable magnification motor to drive the variable magnification lens-sheet to move to perform the variable magnification based on the target variable magnification curve, or may control the focusing motor to drive the focusing lens-sheet to move to perform the focusing based on the target variable magnification curve.

It should be noted that, when the variable magnification apparatus provided in the above embodiment performs the focusing (only the above-mentioned division of each functional module is used as an example for illustration), in actual applications, the above-mentioned functions may be assigned to different functional modules to complete based on requirements, that is, the internal structure of the apparatus is divided into different functional modules to complete all or part of the functions described above. In addition, the variable magnification apparatus provided in the above embodiment and the variable magnification method have the same concept, and the specific implementation process of the variable magnification apparatus refers to the embodiment of the method in detail and will not be repeated here.

An embodiment of the present application provides a non-volatile computer-readable storage medium storing a computer program. The computer program, when executed by a processor, implements the any of the above-mentioned variable magnification method.

An embodiment of the present application provides executable program codes, configured for, when executed, performing any of the above-mentioned variable magnification method.

Those skilled in the art may understand that all or part of the steps to implement the above-mentioned embodiments may be completed by hardware, or may be completed by a program instructing related hardware. The program may be stored in a computer-readable storage medium. The above-mentioned storage medium may be a read-only memory, a magnetic disk, an optical disk, or the like.

The above described embodiments are simply preferable embodiments of the present application, and are not intended to limit the present application. Any modifications, equivalent alternatives, improvements, or the like within the spirit and principle of the present application shall be included within the scope of protection of the present application.

The invention claimed is:

1. A variable magnification method, comprising:
   after receiving a variable magnification instruction, acquiring angle parameters for a current position of a camera; wherein, the variable magnification instruction is configured for instructing the camera to perform variable magnification based on a target magnification ratio parameter; the angle parameters for the current position comprise a first angle of the camera in a horizontal direction and a second angle of the camera in a vertical direction;
   querying historical focusing information corresponding to the angle parameters for the current position in a pre-stored focusing information correspondence table as target historical focusing information; wherein, the focusing information correspondence table stores at least one set of correspondence between angle parameters for a position and historical focusing information; the target historical focusing information comprises a historical magnification ratio parameter and a historical in-focus parameter of the camera;
   acquiring a target object distance value corresponding to the historical magnification ratio parameter and the historical in-focus parameter;
   querying a target variable magnification curve corresponding to the target object distance value in a pre-stored correspondence between variable magnification curves and object distance values; and
   controlling the camera to perform the variable magnification based on the target variable magnification curve.

2. The method of claim 1, wherein, the focusing information correspondence table records at least one set of correspondence between an angle range and historical focusing information, and the angle range comprises a vertical angle sub-range and a horizontal angle sub-range;

querying historical focusing information corresponding to the angle parameters for the current position in a pre-stored focusing information correspondence table as target historical focusing information, comprises:
determining the horizontal angle sub-range in which the first angle is located in the focusing information correspondence table as a horizontal angle sub-range to be queried, and determining the vertical angle sub-range in which the second angle is located in the focusing information correspondence table as a vertical angle sub-range to be queried; and
in the focusing information correspondence table, querying historical focusing information corresponding to the horizontal angle sub-range to be queried and the vertical angle sub-range to be queried as target historical focusing information.

3. The method of claim 2, further comprising:
if the historical focusing information corresponding to the angle parameters for the current position is not found in the focusing information correspondence table, determining a first angle range in the focusing information correspondence table; wherein the first angle range comprises a first target vertical angle sub-range and a first target horizontal angle sub-range; the first target vertical angle sub-range is adjacent to the vertical angle sub-range; the first target horizontal angle sub-range is identical to the horizontal angle sub-range; and
acquiring historical focusing information corresponding to the first angle range as the target historical focusing information.

4. The method of claim 3, further comprising:
if the first angle range is not determined in the focusing information correspondence table, determining a second angle range; wherein, the second angle range comprises a second target vertical angle sub-range and a second target horizontal angle sub-range; the second target horizontal angle sub-range is adjacent to the horizontal angle sub-range; the second target vertical angle sub-range is identical to the vertical angle sub-range; and
acquiring historical focusing information corresponding to the second angle range as the target historical focusing information.

5. The method of claim 1, wherein, after querying a target variable magnification curve corresponding to the target object distance value in the pre-stored correspondence between variable magnification curves and object distance values, the method further comprises:
in the process of controlling the camera to perform the variable magnification based on the target variable magnification curve, controlling the camera to perform an automatic focusing based on the target variable magnification curve.

6. The method of claim 5, wherein after, in the process of controlling the camera to perform the variable magnification based on the target variable magnification curve, controlling the camera to perform the automatic focusing based on the target variable magnification curve, the method further comprises:
acquiring an in-focus parameter when the focusing of the camera is completed;
storing the in-focus parameter, the target magnification ratio parameter and the angle parameters for the current position in the focusing information correspondence table in correspondence to each other.

7. The method of claim 5, wherein, the target variable magnification curve is configured for indicating a correspondence between magnification ratio parameters and in-focus parameters; in the process of controlling the camera to perform the variable magnification based on the target variable magnification curve, controlling the camera to perform automatic focusing based on the target variable magnification curve, comprises:
in the process of controlling the camera to perform the variable magnification based on the target variable magnification curve, acquiring a real-time magnification ratio parameter of the camera;
acquiring a real-time in-focus parameter corresponding to the real-time magnification ratio parameter based on the real-time magnification ratio parameter and the target variable magnification curve; and
controlling the camera to perform the automatic focusing based on the real-time in-focus parameter.

8. A non-transitory computer-readable storage medium, wherein the computer-readable storage medium stores a computer program, the computer program can, when executed by a processing component, implement the variable magnification method of claim 1.

9. A camera, comprising: a lens, an electrical motor and a microprocessor, wherein the lens comprises a variable magnification lens-sheet; the electrical motor comprises a variable magnification motor; the variable magnification motor is connected to the variable magnification lens-sheet; and the microprocessor is configured for:
after receiving a variable magnification instruction, acquiring angle parameters for a current position of a camera; wherein, the variable magnification instruction is configured for instructing the camera to perform variable magnification based on a target magnification ratio parameter;
querying historical focusing information corresponding to the angle parameters for the current position in a pre-stored focusing information correspondence table as target historical focusing information; wherein, the focusing information correspondence table stores at least one set of correspondence between angle parameters for a position and historical in-focus information; the target historical focusing information comprises a historical magnification ratio parameter and a historical in-focus parameter of the camera;
acquiring a target object distance value corresponding to the historical magnification ratio parameter and the historical in-focus parameter; querying a target variable magnification curve corresponding to the target object distance value in the pre-stored correspondence between variable magnification curves and object distance values; and
controlling the variable magnification motor to drive the variable magnification lens-sheets to move to perform variable magnification based on the target variable magnification curve.

* * * * *